Patented Jan. 17, 1967

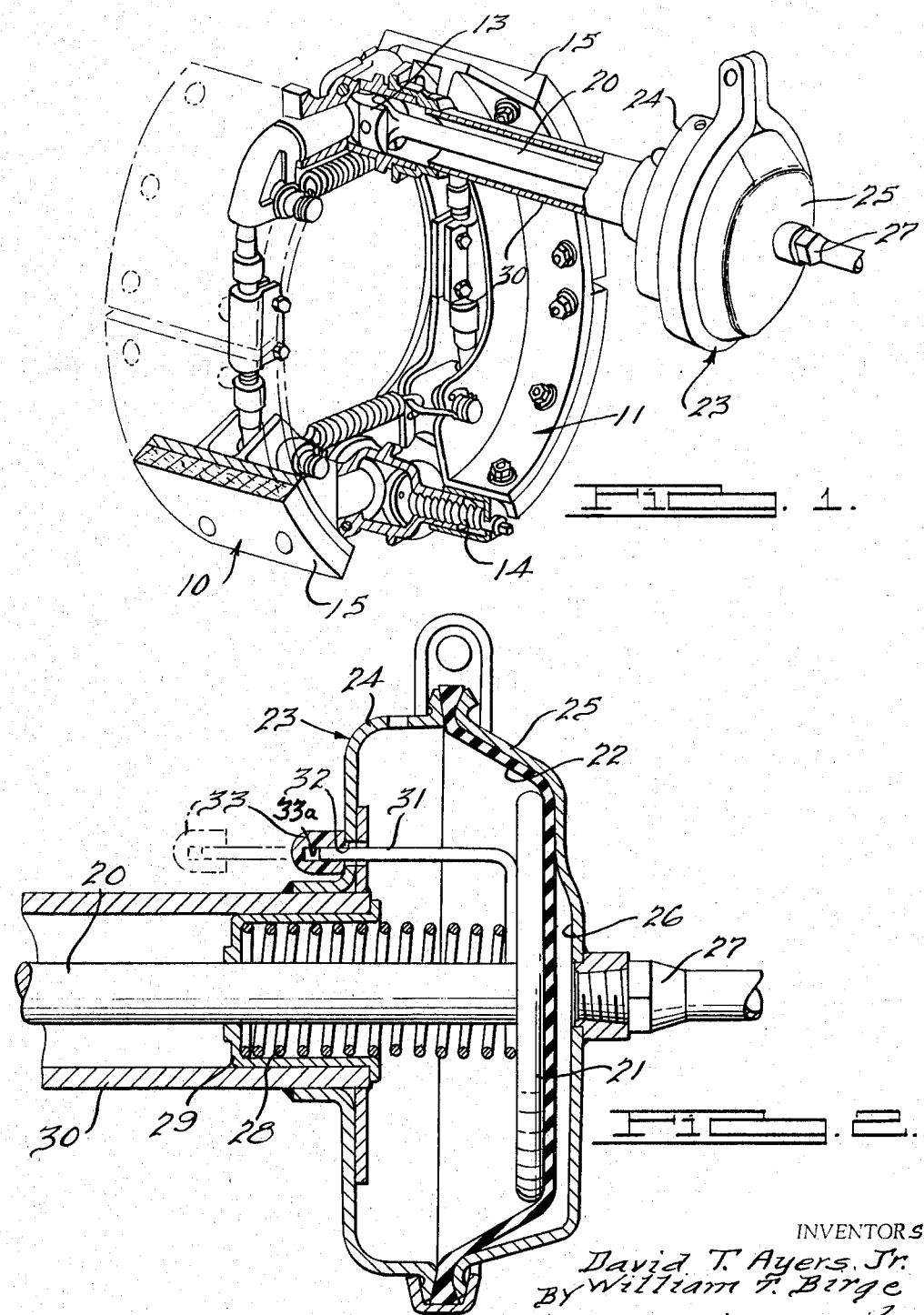

3,298,466
BRAKE WEAR INDICATOR
David T. Ayers, Jr., Birmingham, and William T. Birge, Plymouth, Mich., assignors to Kelsey-Hayes Company, Romulus, Mich., a corporation of Delaware
Filed Feb. 3, 1965, Ser. No. 430,003
5 Claims. (Cl. 188—1)

This invention relates to brakes and, more particularly, brake actuators incorporating an air or vacuum operated diaphragm. Brakes of the type employing a diaphragm actuator are usually moved to operative position by a wedge, a cam or similar means that is moved by a push rod or the like connected to the diaphragm. Usually, a spring is associated with the diaphragm to return the diaphragm and rod to inoperative position. With structures of this general type, it is frequently difficult to determine when the brake linings have become worn to the extent that the brake shoes need adjustment or replacement.

It is therefore a principal object of this invention to provide means, visible from the exterior of the brake, to indicate when the diaphragm and rod have moved an excessive amount and thus that the brake shoes should be adjusted or replaced.

As stated above, a spring is associated with the diaphragm which is adapted to be compressed when the diaphragm is actuated to apply the brakes. In accordance with this invention, a signal device is associated with said spring which will move with the spring and indicate the extent of movement of the daphragm. When the diaphragm and hence the spring have been moved an excessive amount, this will be apparent from the position of the signal device and the operator will be advised that the brake shoes need adjustment or replacement.

The objects of this invention are attained in a simple but effective manner. One coil, preferably the bottom or a lower coil of the spring, is provided with an extension which extends substantially parallel to the axis of the spring and extends through an opening to the exterior of the housing which contains the diaphragm and spring. When the diaphragm has moved an excessive distance and compressed the spring correspondingly, the extention will be projected beyond the housing a distance corresponding to the compression of the spring. If the extension is projected a given amount beyond the housing, this will provide a signal that these parts have moved an excessive distance and that corrective measures should be taken.

Further objects of this invention are to provide a device of this type which is efficient, durable, and of simple construction, comprising a minimum number of parts whereby it may be economically manufactured and easily installed.

The various objects and advantages, and the novel details of construction of one comercially practical embodiment of the invention, will become more apparent as this description proceeds, especially when considered in connection with the acompanying drawings, in which:

FIGURE 1 is a fragmentary perspective view of a shoe type brake; and

FIGURE 2 is an enlarged fragmentary sectional view of the actuating cylinder or housing and of the adjacent structure.

The invention of this application may be used to advantage with various types of brakes. One typical type is shown in FIGURE 1, the brake drum being omitted.

In FIGURE 1, the reference characters 10 and 11 indicate a pair of brake shoes adapted to be expanded or moved outwardly into engagement with the brake drum (not shown). The brake shoes are moved outwardly by an expander 13 shown in the form of a wedge-like member. The reference character 14 indicates an adjusting mechanism whereby the position of the brake shoes may be initially adjusted and may be subsequently adjusted to compensate for wear on the brake linings 15.

The wedge member 13 is actuated by a rod 20 which, as shown in FIGURE 2, is provided with a head or flange 21 which bears against the diaphragm 22. The reference character 23 indicates the actuating cylinder which may be formed of two parts 24 and 25 with the edge of the diaphragm 22 clamped between the two housing sections 24 and 25. The brake may be actuated by air or vacuum means which is admitted into the chamber 26 behind the piston through a conduit 27 connected to the power source. When a power medium is admitted into the chamber 26, the diaphragm 22 will be moved to the left, as viewed in FIGURE 2, and thus move the rod 20 to actuate the expander or wedge device 13. The diaphragm 22 may be formed of any desired flexible material, such as rubber, leather or the like.

When the power means is relieved or shut off, the rod 20, head 21 and diaphragm 22 are returned to their normal positions illustrated in FIGURE 2, by means of a spring 28 which bears against the head 21 on one end and against a cap member 29 on the other end which is secured in the end of a tubular member 30 which supports the actuating cylinder or housing 23 on the brake structure.

The signal device of this invention consists of an extension 31 of the spring 28 which extends parallel to the axis of the spring and through an opening 32 in the housing 23 to the exterior of the housing. The extension 31 may be formed as part of any of the coils of the spring 28 but is preferably formed as an extension of the lowermost coil of this spring, as shown in FIGURE 2.

When the power is applied to the diaphragm, the spring 28 is compressed and the extension 31 will be projected through the opening 32 in the housing to the extent that the spring 28 is compressed. The amount the spring is compressed depends upon the amount the diaphragm 22 and hence the rod 20 move in a brake applying direction. If the extension 31 is projected an unusually large amount beyond the housing, this will provide a signal that these parts have moved an excessive distance and that the brake linings need adjustment or replacement.

The end of the extension 31 is preferably provided with a cap 33 formed of plastic or some other suitable material. The cap may be of some readily discernible color so that the position of the cap 33 and thus the extent of movement of the extension 31 may be readily ascertained. The cap 33 is provided with a relatively long recess 33a so that it may have a force-fit with the extension 31. The length of the recess 33a is such that the cap 33 may be secured onto the extension 31 against the housing 23 when the spring 28 is in its fully expanded or relaxed condition.

The cap 33 normally engages the housing 24 and prevents dirt and other contaminants from entering the opening 32 and facilitates measuring the extent of movement of the extension 31. The cap 33 engages the housing section 24 when the brakes are off, so that after the brakes are applied it is only necessary to measure the distance from the cap 33 to the housing section 24 to determine the amount of movement of the extension 31. In the absence of the cap 33, it would be necessary to measure the distance from the end of the extension 31 to housing section 24 and then deduct the amount by which the extension 31 projected from the housing section 24 before the brakes were applied. The distance the cap 33 moves away from the adjacent surface of the housing readily indicates the extent of movement of the extension and hence the amount the diaphragm 22 and rod 20 have been moved in order to apply the brakes. As stated, if this movement is excessive, it will indicate that the brake linings need adjustment or replacement.

Obviously, while one type of brake construction is illustrated, the objects of this invention may be attained with any type of brake construction having a spring influenced movable push rod or the like which is employed to actuate the brakes.

From the foregoing, it will be apparent that there is provided a positive signal device for brakes which approaches the ultimate in structural simplicity and thus may be manufactured and assembled at a very nominal cost. The device is positive in its operation and contains no parts which are apt to get out of order. It is efficient, durable, and of simple construction, comprising a minimum number of parts whereby it may be economically manufactured and assembled with facility.

While one commercially practical embodiment of the invention has ben described and illustrated herein somewhat in detail, it will be understood that various changes may be made as may come within the purview of the accompanying claims.

What is claimed is:

1. In a brake including brake shoes and operating means therefor comprising a diaphragm, spring means acting on said diaphragm to return the diaphragm to inoperative position, and a housing enclosing said diaphragm and spring means, that improvement which comprises, an extension on a coil of said spring extending through said housing to the exterior thereof to indicate the extent of the movement of said spring and diaphragm.

2. In a brake including brake shoes and operating means therefor comprising a diaphragm, spring means acting on said diaphragm to return the diaphragm to inoperative position, and a housing enclosing said diaphragm and spring means, that improvement which comprises, an extension on a coil of said spring substantially parallel to the axis of said spring, said extension extending through said housing to the exterior thereof to indicate the extent of the movement of said spring and diaphragm in the brake operating direction.

3. In a brake including brake shoes and operating means therefor comprising a diaphragm, spring means acting on said diaphragm to return the diaphragm to inoperative position, and a housing enclosing said diaphragm and spring means, that improvement which comprises, a substantially straight extension on one of the coils of said spring arranged substantially parallel to the axis of said spring, said extension extending through an opening in said housing to the exterior thereof, said extension being projected through said opening as the spring is compressed to indicate the extent of the movement of said spring and diaphragm in the brake operating direction.

4. A device as described in claim 3, in which the end of said extension is provided with a cap-like member which closes said housing opening in the inoperative position of the brakes and wherein movement of said extension may be readily determined by the distance said cap-like member moves away from said housing.

5. A device as described in claim 3, in which the cap-like member is provided with an elongated recess to receive said extension so that said cap may be secured onto said extension a sufficient distance to engage said housing when the spring is in its fully expanded condition.

References Cited by the Examiner

UNITED STATES PATENTS

| | | | |
|---|---|---|---|
| 2,117,031 | 5/1938 | Lion | 188—1 |
| 3,055,456 | 9/1962 | Pfeiffer | 188—1 X |

DUANE A. REGER, *Primary Examiner.*